Feb. 27, 1968   W. F. MALSBARY   3,370,791
MULTI-TEMPERATURE FLUID DELIVERY APPARATUS
Filed Jan. 7, 1966
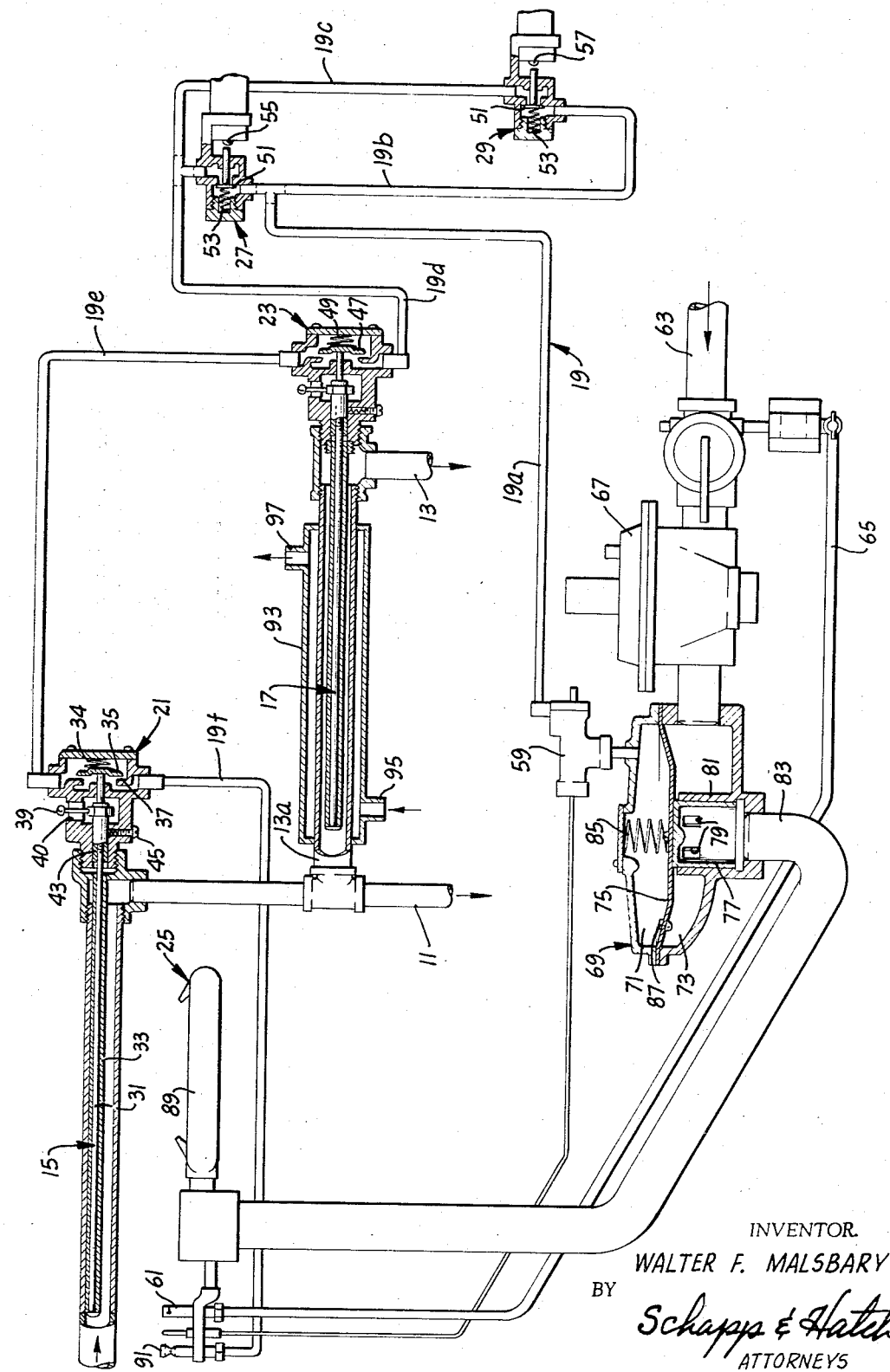
INVENTOR.
WALTER F. MALSBARY
BY
Schapps & Hatch
ATTORNEYS United States Patent Office 3,370,791
Patented Feb. 27, 1968

3,370,791
MULTI-TEMPERATURE FLUID DELIVERY
APPARATUS
Walter F. Malsbary, Oakland, Calif., assignor to Malsbary
Manufacturing Company, Oakland, Calif., a corporation of California
Filed Jan. 7, 1966, Ser. No. 519,324
13 Claims. (Cl. 236—23)

ABSTRACT OF THE DISCLOSURE

A multi-temperature fluid delivery apparatus constructed with a demand controlled heater formed to heat a hot line and at least one other line colder than the hot line, the control being effected by a thermostat in each line with each thermostat operating a temperature controlled valve placed in a gas pressurized control line in series relation whereby all the temperature controlled valves must be opened to provide heat, and a plurality of flow control valves disposed in parallel in the gas pressurized control line, with one of said flow control valves disposed on each fluid delivery line so that one of the fluid delivery lines must be flowing to provide heat in addition to the operation of the temperature controlled valves; the colder fluid delivery lines each being preferably formed with a fluid connection to the hot line for receipt of at least some fluid therefrom.

This invention relates to a Multi-Temperature Fluid Delivery Apparatus and more particularly to apparatus for cleaning equipment and the like, the apparatus being adapted to deliver a plurality of fluids at different temperatures for performing different cleaning functions.

Heretofore, in cleaning apparatus, such as steam cleaning and rinsing apparatus, it has been common practice to provide two separate discharge hoses, one for steam and the other for rinse water. In such apparatus, the steam is provided by heating water to a temperature at which it forms steam vapor when discharged into the atmosphere. The hot rinsing water is provided by mixing some relatively cool water with the water heated to the aforementioned temperature so that the rinse water discharged, while hot, is not hot enough to form steam vapor.

This type of steam cleaning and rinsing machines has several disadvantages. For instance, the water must be continuously heated to the aforementioned temperature regardless of whether a steam cleaning or rinsing operation is being performed, thereby using a significant amount of fuel. Moreover, this type of apparatus normally requires the manual operation of several valves to switch from steam to rinsing water. Furthermore, these machines usually are capable of supplying fluid, either steam or water, only at two temperatures, thus preventing their use for cleaning equipment where it is desired to provide cleaning fluids at three or more different temperatures.

Accordingly, one of the principal objects of the present invention is the provision of multi-temperature fluid delivery apparatus in which fluids at different temperatures may be selected by an operator and delivered through different lines for different cleaning operations.

Another object of this invention is the provision of apparatus such as described in which a heating unit is operated only as much as necessary to heat fluid to the particular temperature selected by the operator of the apparatus, thereby providing for fuel economy and preventing fuel waste.

A further object of the present invention is the provision of apparatus of the class described which is substantially automatic in operation after the operator has selected the temperature at which he wants the fluid and actuates a delivery valve at the end of the delivery line.

Further objects and advantages of the invention will be apparent as the specification progresses, and the new and useful features of the Multi-Temperature Fluid Delivery Apparatus will be fully defined in the claims attached hereto.

In the accompanying drawing, one of various possible embodiments of the invention is illustrated.

While the multi-temperature fluid delivery apparatus of this invention will be described as used as a steam cleaning and rinsing machine, it will be understood that the apparatus could be used in several other ways, as pointed out hereinafter.

Referring now to the drawing, a multi-temperature fluid delivery apparatus constructed in accordance with this invention is shown to include a plurality of fluid delivery lines 11 and 13, and a plurality of thermostats 15 and 17, there being a different thermostat in each fluid delivery line. A gas pressurized control line generally designated 19 is included, as well as a plurality of temperature control valves 21 and 23 in the control line 19, there being one temperature control valve for each thermostat 15 and 17. The valve 21 is operated by thermostat 15 and the valve 23 is operated by thermostat 17. Heating means generally indicated at 25 is adapted to be rendered operative in response to a decrease in gas pressure in the control line 19 and the pressure in the control line is decreased upon opening of both of the temperature control valves 21 and 23. Control line 19 includes a pair of control valves 27 and 29 which are adapted to be opened in response to the flow of fluids through the lines 11 and 13, respectively.

Fluid delivery line 11 is adapted to convey a liquid, such as water, from a source (not shown) through the area heated by heating means 25, and to a discharge nozzle (not shown) at which point the water is adapted to be discharged through a manually operated valve (not shown) in the form of steam, for example. Fluid delivery line 13 includes a section 13a connected to line 11 and branching therefrom. Line 13 extends to a discharge nozzle (not shown) having a manually operated valve (not shown) which is adapted to open and close the line. As will be made apparent hereinafter, the line 13 as shown is normally used to deliver water for cleaning or rinsing purposes.

As shown, thermostat 15 includes a rod or wire 31, such as an Invar rod, located inside a metal tube 33 and secured to the outer end of the latter. The complete thermostat 15 is located in line 11 upstream from the junction of line 11 and line 13. Thermostat 15 is connected to valve 21 and is adapted to open the latter when the temperature of the water passing through the portion of line 11 in which thermostat 15 is located falls below a predetermined level, such as 325° F. As the water temperature rises above the predetermined level, the thermostat 15 will allow a spring 34 to close a valve member 35 on a seat 37. An adjusting screw 39 extends through an arcuate slot 40 in the body of valve 21 for adjusting a bushing 43 connected to rod 31. A tension screw 45 is provided for maintaining bushing 43 in the position to which screw 39 is swung.

Thermostat 17 is similar to thermostat 15 but is adapted to close a valve 23, which is similar to valve 21, when the temperature of the water flowing through section 13a of line 13 is above a second predetermined level, such as 140° F. When the temperature of the water passing through section 13a of line 13 drops below the second predetermined level, the thermostat 17 will open a valve member 47 in the valve 23 against the bias of a spring 49.

The temperature control valves 21 and 23 are connected in series in gas pressurized line 19, which is made up of a plurality of sections 19a, 19b, 19c, 19d, 19e and 19f. Each of the control valves 27 and 29 includes a valve member 51 biased toward a closed position by a spring 53. Valve member 51 of valve 27 is adapted to be opened by an actuator 55 upon the flow of fluid through line 11. Similarly, the valve member 51 of valve 29 is adapted to be opened by an actuator 57 upon the flow of fluid through line 13. It will be seen that valves 27 and 29 are connected in parallel in line 19 so that upon the opening of either of these valves section 19a of line 19 is placed in communication with section 19d of the line. Line 19a is connected to a conventional safety pilot valve 59 which is adapted to close if a pilot light emitted from a pilot 61 should be extinguished. Pilot 61 is connected to a gas supply line 63 by a line 65.

Line 63 includes a conventional pressure regulator 67 for regulating the pressure in the line. Line 63 is connected at its outer end to a diaphragm controlled valve 69 which is divided into two compartments 71 and 73 by a diaphragm 75. Diaphragm 75 is connected to a tubular valve member 77 which has openings 79 therein, the valve member 77 being slideable in a tubular projection 81 extending upwardly toward diaphragm 75. Diaphragm 75 is biased by a spring 85 towards a position wherein communication between compartment 73 and a line 83 is blocked. Line 19 is adapted to be pressurized with gas by means of a small orifice 87 extending between compartments 71 and 73. Line 83 is connected to a burner 89 located in position to heat the water passing through the line 11 upstream of the junction of line 11 and line 13.

A bleed gas burner 91 is attached to line 19f for burning off the gas which passes through orifice 87, compartment 71, safety pilot 59, and line 19. A manifold 93 surrounds section 13a of line 13 and has an inlet 95 and an outlet 97 which are adapted to be connected to a line conveying a chemical, such as a cleaning agent, which is to be mixed with the water passing through line 11.

Assuming it is desired to utilize the apparatus for cleaning a piece of equipment and that it is desired to have both steam coming from one line and water at a temperature of approximately 140° F. from another line, operation of the apparatus is as follows:

As set forth above, steam line 11 is connected to one nozzle having a manually operable valve and water line 13 is connected to another nozzle having a manually operable valve. Assuming it is desired first to use steam for cleaning purposes, the manually operable valve on the outer end of line 11 is opened, thereby permitting a pump (not shown) to pump water through the line 11 to the discharge end thereof. At this time, assuming the temperature of the water passing through line 11 is well below 140° F., both valves 21 and 23 are open. The flow of water through line 11 causes valve 27 to open, thereby placing the compartment 71 in valve 69 in communication with the bleed gas burner 91 through the open line 19. Assuming the pressures on both sides of the diaphragm 75 in valve 69 are equal prior to the operation of the apparatus, spring 85 maintains the valve diaphragm in a valve closing position. The opening of valve 27, and valves 21 and 23, causes the pressure within compartment 71 to drop and the pressure in compartment 73 forces the diaphragm 75 upwardly as viewed in the drawing against the bias of spring 85, thereby opening the valve 69. Gas then flows through the line 63, pressure regulator 67, valve 69, and line 83 to burner 89 where it is ignited and begins to heat the water passing through line 11.

As the water is heated past 140° F., one might think that some of this water would eventually cause the thermostat 17 to close the valve 23. However, when the manually operable valve on the discharge end of line 11 is opened, the chemical or cleaning agent is pumped through the manifold 93 and subsequently mixes with the water flowing through line 11. The chemical pumped through manifold 93 is cool and maintains the water in section 13a in a relatively cool condition, i.e., below 140° F., thereby preventing the thermostat 17 from closing the valve 23.

When the water in line 11 adjacent the thermostat 15 reaches approximately 325° F., for example, the thermostat 15 closes valve 21, and this allows the pressure in compartment 71 of valve 69 and the pressure in line 19 to increase toward the pressure in chamber 73. As the pressure in chamber 71 increases, spring 85 closes the valve member 77 in projection 81, thereby shutting off the supply of gas to burner 89. The flame emitted from burner 89 is thereby extinguished. As soon as the temperature of the water adjacent thermostat 15 drops below 325° F., the valve 21 is opened and the pressure in line 19 and compartment 71 drops, thereby permitting the gas pressure in chamber 73 to raise diaphragm 75 and open the valve 69. Gas then flows again to burner 89 where it is ignited and begins to heat the water in line 11 adjacent thermostat 15. The valve member 35 of valve 21 is then modulated between an open and closed position in the above described manner to allow and interrupt the flow of gas to burner 25 and thereby maintain the temperature of the water flowing past thermostat 15 at approximately 325° F. This water, as it flows through line 11, is discharged from the outer end thereof as steam mixed with the cleaning agent flowing through the manifold 93.

When it is desired to use water at approximately 140° F. for cleaning purposes, the valve on the outer end of line 11 is closed and the valve on the outer end of line 13 is opened. This permits water to flow through section 13a in line 13 to the discharge end of the latter. The flow of water through line 13 causes valve 29 to open. If the line 13 is opened very shortly after the line 11 is closed, a flow of water at some temperature higher than 140° F. will pass through section 13a and around thermostat 17. This causes the valve 23 to close and the latter will remain closed until the water passing through section 13a drops below approximately 140° F. When the temperature does drop below approximately 140° F., valve 23 is opened and since the temperature of water passing through line 11 adjacent thermostat 15 is well below 325° F., the valve 21 is also opened. As a result, the line 19 is open and the pressure in compartment 71 drops, permitting the pressure in compartment 73 to raise diaphragm 75 and open the valve 69. As explained previously, this permits gas to pass through line 63, pressure regulator 67, valve 69 and line 83 to burner 89, where the gas is ignited and the water passing through line 11 upstream of section 13a, section 13a per se and line 13, is heated. As the water passing through the section 13a reaches approximately 140° F., the thermostat 17 closes valve 23 which, as explained previously, causes valve 69 to close and cut off the flow of gas to burner 89, thereby causing the flame emitted from the burner to be extinguished. The flow of gas to burner 89 is then controlled by the operation of valve 23 in this manner until the line 13 is closed.

If it is desired to use a steam cleaning line 11 again shortly after the line 13 has been used, the water adjacent thermostat 17 may be slightly above 140° F. and the thermostat 17 may therefore have valve 23 in a closed position. Since valve 23 is in closed condition, line 19 cannot be opened and the valve 69 will remain closed, thereby preventing the flow of gas to burner 89. However, the thermostat 17 will be rapidly cooled so that valve 23 will open, since the cleaning agent flows through the manifold 93 when the line 11 is opened. This cools the thermostat 17 and the valve 23 is open, thereby placing the compartment 71 in communication with bleed gas burner 91 through valve 59 and open line 19. The flame emitted from burner 89 is then controlled in a manner previously described to maintain the water passing through line 11 at approximately 325° F.

Although not shown in the drawing, it will be understood that if it is desired to have a plurality of separate lines 13, each adapted to operate at a different temperature, it is only necessary that a plurality of sections 13a be connected to line 11, and a plurality of thermostats similar to thermostat 17 and temperature operated valves similar to valve 23 be incorporated between line 11 and line 19. The thermostats should be adapted to operate at various temperatures, so that water could be supplied at any number of different temperatures. In this regard, it might be desirable to use additional lines 13, including the associated thermostats 17, sections 13a, and valves 23, for additional functions such as a phosphitizing function, a pressure washing function with a neutral chemical added, a cleaning function for stainless steel and aluminum products or pieces of equipment using a brightening cleaner, for example, or a sanitizing and deodorizing function. Each of these functions could be adapted to operate at a different temperature level and each could have its own line connected to the system, the lines being connected to line 11 progressively upstream of one another as the operating temperatures of the associated thermostats progressively increase, i.e., a line having a thermostat which operates its associated valve 23 at 150° F. would be connected to line 11 upstream of the line 13a shown in the drawing, etc.

In view of the foregoing, it will be seen that the multi-temperature fluid delivery apparatus of this invention permits the delivery of fluids at different temperatures which may be selected by an operator and delivered through different lines for different cleaning operations. Moreover, this apparatus includes a heating unit which is adapted to be operated only as much as necessary to heat the fluid to the particular temperature selected by the operator of the apparatus, thereby preventing fuel waste. Furthermore, it will be noted that the different temperatures are achieved merely by opening one particular delivery line of the system, thus eliminating complicated controls.

As various changes could be made in the above constructions without departing from the scope of the invention, it is intended that all matter contained in the above description or shown in the accompanying drawing shall be interpreted as illustrative and not in a limiting sense.

I claim:

1. Multi-temperature fluid delivery apparatus comprising a first delivery line for delivering one fluid at approximately one temperature, a second delivery line for delivering a second fluid at approximately another temperature, first and second thermostats in said first and second delivery lines, respectively, a gas pressurized control line, first and second temperature controlled valves in said control line operated by said first and second thermostats, respectively, to vary the pressure in the control line, and heating means operative in response to the pressure in said control line for heating the fluid in said delivery lines to approximately the temperatures at which said first and second valves are operated.

2. Apparatus as set forth in claim 1, further comprising first and second control valves connected in parallel in said control line, said first control valve being adapted to be opened for initiating delivery of fluid at approximately said one temperature through said first delivery line, said second control valve being adapted to be opened for initiating delivery of fluid at approximately said second temperature through said second delivery line, whereby the heating means is operative only when one of the control valves is opened.

3. Apparatus as set forth in claim 1 wherein said heating means includes a burner, a fuel line for delivering fuel to said burner, and a fuel valve for controlling the flow of fuel through said fuel line, said fuel valve including means for opening and closing the fuel valve in response to a change in pressure in said control line.

4. Apparatus as set forth in claim 3 wherein said fuel valve has an inlet and an outlet, and said means for opening and closing said fuel valve comprises a diaphragm dividing said fuel valve into first and second compartments and adapted for movement between a first position wherein communication between said inlet and said outlet is blocked and a second position wherein communication between said inlet and outlet is established through said first compartment.

5. Apparatus as set forth in claim 4 wherein said means for opening and closing said fuel valve further includes a spring biasing said diaphragm toward its first position, said control line being connected to said second compartment, said spring, upon the existence of substantially equal pressures in said first and second compartments, causing said diaphragm to be moved to its first position, said diaphragm moving to its second position when the pressure in said first compartment is greater than the pressure in said second compartment.

6. Apparatus as set forth in claim 1 wherein said first thermostat is adjustable and said first valve is adapted to be closed when the temperature of the fluid adjacent said first thermostat is above the adjusted level, and said second thermostat is adjustable and said second valve is adapted to be closed when the temperature of the fluid adjacent said second thermostat is above a second adjusted level.

7. Multi-temperature fluid delivery apparatus comprising a first delivery line, a second delivery line connected to and branching from said first line, first and second thermostats in said first and second lines, respectively, a gas pressurized control line, normally closed first and second control valves connected in parallel in said control line and adapted to be opened upon the flow of fluid through said first and second delivery lines, respectively, first and second temperature controlled valves connected in series in said control line and operated by said first and second thermostats, respectively, to vary the pressure in said control line, and heating means operative in response to a change in pressure in said control line for heating the fluid in said delivery lines.

8. Apparatus as set forth in claim 1 wherein said first thermostat is located in said first delivery line upstream of said second delivery line, said first temperature controlled valve being located in said control line downstream of said first temperature controlled valve, said first thermostat being adapted to open said first temperature controlled valve when the temperature adjacent said first thermostat is below a first temperature, said second thermostat being adapted to open said second temperature controlled valve when the temperature adjacent said second thermostat is below a second temperature, said second temperature being below said first temperature, and said heating means being rendered operative when one of said control valves is open and both of said temperature controlled valves are open.

9. Apparatus as set forth in claim 8 wherein said heating means includes a burner, a fuel line for delivering fuel to said burner, and a fuel valve for controlling the flow of fuel through said fuel line, said fuel valve including means for opening and closing the fuel valve in response to a change in pressure in said control line.

10. Apparatus as set forth in claim 9 wherein said fuel valve has an inlet and an outlet, and said means for opening and closing said fuel valve comprising a diaphragm dividing said fuel valve into first and second compartments and adapted for movement between a first position wherein communication between said inlet and said outlet is blocked and a second position wherein communication between said inlet and outlet is established through said first compartment.

11. Apparatus as set forth in claim 10 wherein said means for opening and closing said fuel valve further includes a spring biasing said diaphragm toward its first position, said control line being connected to said second compartment, said spring, upon the existence of substantially equal pressures in said first and second compartments, causing said diaphragm to be moved to its first position, said diaphragm moving to its second position when the pressure in said first compartment is greater than the pressure in said second compartment.

12. Apparatus as set forth in claim 7, wherein said second delivery line is constructed to include a heat exchanger between its connection with the first line and the location of the thermostat therein.

13. Multi-temperature fluid delivery apparatus comprising a plurality of fluid delivery lines, a plurality of thermostats, there being a different one in each line, a gas pressurized control line, a plurality of temperature controlled valves in said control line, there being one temperature controlled valve for each thermostat, each temperature controlled valve being operated by a different thermostat, said temperature controlled valves being connected in series in said control line, a plurality of control valves connected in parallel in said control line, there being a different control valve for each delivery line, each control valve being opened when fluid is flowing through its respective delivery line, and heating means adapted to be rendered operative in response to a decrease in pressure in said control line, the pressure in said control line being decreased upon opening of all of said temperature controlled valves and one of said control valves.

References Cited
UNITED STATES PATENTS

| | | | |
|---|---|---|---|
| 2,262,823 | 11/1941 | Stearns | 236—80 X |
| 2,262,825 | 11/1941 | Welliver | 236—80 X |
| 2,952,136 | 9/1960 | Spence | 236—80 X |
| 3,118,600 | 1/1964 | Miller | 236—23 |
| 3,123,065 | 3/1964 | Conley | 236—20 X |

EDWARD J. MICHAEL, *Primary Examiner.*